United States Patent [19]

Krimmel et al.

[11] Patent Number: 5,550,667
[45] Date of Patent: Aug. 27, 1996

[54] OPTICAL TRANSMITTER

[75] Inventors: Heinz Krimmel, Stuttgart; Henning Bülow, Ludwigsburg; Rolf Heidemann, Tamm; Jürgen Otterbach, Leonberg, all of Germany

[73] Assignee: Alcatel N.V., Rijswijk, Netherlands

[21] Appl. No.: 108,325

[22] Filed: Aug. 18, 1993

[30] Foreign Application Priority Data

Aug. 22, 1992 [DE] Germany .......................... 42 27 859.7
Oct. 14, 1992 [DE] Germany .......................... 42 34 599.5

[51] Int. Cl.⁶ .................................................. H04B 10/04
[52] U.S. Cl. .......................................... 359/180; 359/161
[58] Field of Search ..................................... 359/160–161, 359/180–183; 372/6,26,38; 375/60; 328/162

[56] References Cited

U.S. PATENT DOCUMENTS

| | | | |
|---|---|---|---|
| 5,210,633 | 5/1993 | Trisno | 359/194 |
| 5,293,545 | 3/1994 | Huber | 359/181 |
| 5,315,426 | 5/1994 | Aoki | 359/160 |
| 5,327,279 | 7/1994 | Farina et al. | 359/161 |

FOREIGN PATENT DOCUMENTS

| | | | |
|---|---|---|---|
| 0003431 | 1/1983 | Japan | 359/161 |
| 9409574 | 4/1994 | WIPO . | |

OTHER PUBLICATIONS

G. E. Bodeep et al "Semiconductor Lasers Versus External Modeulators: A Comparison of Nonlinear Distortion for Lightwaves Sub–carrier CATV Applications", IEEE Photonics Technology Letters, vol. 1, No. 11, Nov. 1989, pp. 401–403.

D. Cotter et al "Suppression of Stimulated Brillouin Scattering During Transmission of High–Powered Narrowband Laser Light in Monomode Fibre", Electronics Letters, 22nd Jul. 1982, vol. 18, No. 15, pp. 638–640.

*Primary Examiner*—Leo Boudreau
*Assistant Examiner*—Kinfe-Michael Negash
*Attorney, Agent, or Firm*—Ware, Fressola, Van Der Sluys & Adolphson

[57] ABSTRACT

A laser (2) of an optical transmitter (1) for the transmission of an analog broadband signal for CATV in particular, can be amplitude-modulated in two different manners with an intelligence signal (N). Direct modulation can lead to an undesired additional frequency modulation. With indirect modulation by means of an optical intensity modulator (3), Brillouin scattering occurs at powers of approximately 10 mW in an optical fiber of the transmission path connected to the optical transmitter (1). Both modulations lead to distortions of the transmitted signal. In order to avoid the disadvantages of both modulations in a technically simple fashion, the carrier emitted from a laser (2) is indirectly modulated with an intelligence signal (N) and the laser (2) also faintly directly modulated with an energy-dispersing signal (V). The faint direct modulation leads to a constant, limited wave length alteration of the optical signal, such that Brillouin scattering is reduced, simultaneously with the avoidance of dispersion distortions.

16 Claims, 2 Drawing Sheets 5,550,667

OPTICAL TRANSMITTER

TECHNICAL FIELD

The invention is directed to an optical transmitter for a communications system wherein the carrier generated by a laser is modulated with an intelligence signal (N) and an energy-dispersing signal (V). It is also directed to a transmitter module for an optical transmitter of a communications system with a laser.

BACKGROUND OF THE INVENTION

It is known from G. E. Bodeep et al.: "Semiconductor Lasers Versus External Modulators: A Comparison of Nonlinear Distortion for Lightwave Subcarrier CATV Applications," IEEE Photonics Technology Letters, Vol. 1, No. 11, November 1989, pages 401 through 403, that the laser of this type of transmitter can be amplitude-modulated by two different modulating methods, both of which are marked by drawbacks.

In the first method of modulation, a direct modulation, the laser is electrically modulated with the intelligence signal. Here, an undesired frequency modulation occurs in addition to the desired amplitude modulation. This effect is generally referred to as frequency chirp. The frequency chirp broadens the intrinsic line width of the laser, creating distortions in the transmitted signal caused by fiber dispersion within only a few kilometers of a transmission route.

In the second method of modulation, an indirect modulation, the carrier emitted from the laser is optically modulated with the intelligence signal by means of an intensity modulator which follows the laser. The laser emits at a constant power, preventing frequency chirp. Nonetheless, the maximum transmittable power of a transmitter operating according to this principle is limited by Brillouin scattering in the fibers of the transmission route connected to the optical transmitter. The effect of Brillouin scattering is recognizable at as low as approximately 10 mW of transmitted power. This effect of Brillouin scattering increases with the spectral power density and the length of the optical fibers of the transmission route and leads likewise to a rise in distortions and noise of the transmitted signal.

It was shown in D. Cotter et at.: "Suppression of Stimulated Brillouin Scattering During Transmission of High-Powered Narrowband Laser Light in Monomode Fibre," Electronics Letters, 22nd Jul. 1982, Vol. 18, No. 15, pages 638 through 640, that Brillouin scattering is sharply reduced by means of a constant phase or frequency alteration of an optically amplitude-modulated signal and completely suppressed in an ideal case. It is indicated for this purpose that an additional optical phase modulator be inserted in the optical path of the transmitter or an additional laser be used. In the experiments upon which the aforementioned source is based, a solid laser is employed which can emit in two modes that are 270 MHz apart. This is, however, meaningful only in the dispersion minimum of the fibers.

SUMMARY OF THE INVENTION

The purpose of the invention is to avoid in a technically simple fashion the drawbacks described for the two methods of modulation described.

The problem of the invention is solved by an optical transmitter for a communications system wherein the carrier generated by a laser is modulated with an intelligence signal and an energy-dispersing signal, characterized in that the carrier is directly modulated with the energy-dispersing signal in the laser. The invention is also directed to a transmitter module for an optical transmitter of a communications system with a laser, characterized in that the carrier generated by the laser is directly modulated with an energy-dispersing signal in the laser, and amplified in an optical amplifier included in the transmitter module such that the amplitude variation of the output of the transmitter module is suppressed.

Other advantages of the invention are an optical transmitter of the above type wherein the carrier is modulated with the intelligence in an optical intensity modulator.

A still further advantage of the invention is an optical transmitter of the above type wherein the energy dispersion signal is a signal for compensating the nonlinearity of at least one optical component.

Another advantage of the present invention is an optical transmitter wherein the energy-dispersing signal is derived from the intelligence signal and further where the derivation is obtained from a predistortion circuit and serves to compensate the nonlinearity of the intensity modulator.

A further object of the present invention is an optical transmitter of the above type wherein the intensity modulator is a Mach-Zhender interferometer.

Other advantages of the invention will appear hereinafter.

BRIEF DESCRIPTION OF THE DRAWINGS

To better understand the invention and its advantages, embodiment examples are described in the following with the help of FIGS. 1 through 5. They show.

BEST MODE FOR CARRYING OUT THE INVENTION

Figure 1:
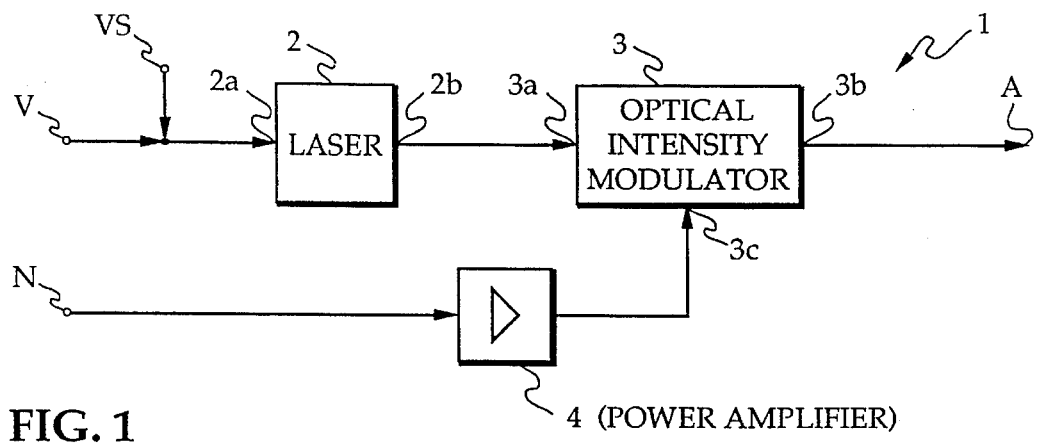
FIG. 1 a first embodiment example of an optical transmitter with a laser according to the invention, FIG. 2 an advantageous second embodiment example with a signal, independent of the intelligence signal, for direct modulation of the laser, FIG. 3 an advantageous third embodiment example in which a signal derived from the intelligence signal is employed for direct modulation of the laser, FIG. 4 a fourth embodiment example with a transmitter module as claimed in the invention, consisting of a laser permitting direct modulation and an optical amplifier, and FIG. 5 the static output-input power curve of an optical amplifier.

A first embodiment example pictured in FIG. 1 contains an optical transmitter (1) with a directly modulated laser (2) and an optical intensity modulator (3). The optical input (3a) of the intensity modulator (3) is also connected to the optical output (2b) of the laser (2). An energy-dispersing signal (V) is combined with a biasing current (VS) and applied to the signal input (2a) of the laser (2) as a modulating signal. This first feeder will also be referred to in the following as the path for direct modulation of the laser (2). In a second feeder, an intelligence signal (N) amplified by a power driver amplifier (4) is applied to the electrical input (3c) of the intensity modulator (3) as a modulating signal for indirect modulation. This second feeder is also referred to in the following as a path for indirect modulation of the laser (2). The signal emerging from the optical output (3b) of the intensity modulator (3) is the output signal (A) of optical transmitter (1).

The laser (2) is faintly modulated with the energy-dispersing signal (V). This produces a limited dispersal of the line width of the laser (2). Dispersal signifies in this context the existence of constant alterations in the wave length of the laser (2). They must be sufficiently slight so that their effect on the transmitted signal due to fiber dispersion is minimized. The wave length alterations lie for example in the magnitude of 4 pm/mA. In the simplest case, the energy-dispersing signal (V) could be a timing signal generated by a quartz [oscillator] or even noise only. The indirect modulation with the intelligence signal (N) containing the information is realized with the intensity modulator (3) on the optical channel. The indirect modulation of the carrier emitted by (2), which is also frequency modulated by means of the faint direct modulation, leads to the fact that Brillouin scattering only becomes apparent in the transmission at relatively high power or long transmission paths, by means of an interfering rise in distortion and by noise of the transmitted signal.

The laser (2) employed must permit angular modulation to at least a limited measure, e.g. permit frequency or phase modulation. Use of a semiconductor laser is particularly suitable.

The intensity modulator (3) should generate in addition to the intensity modulation as little phase modulation or frequency modulation as possible. A Mach-Zehnder (MZ) interferometer is especially well suited for this reason.

In the embodiment example the intelligence signal (N) is an analog broadband signal, as used e.g. in CATV arrangements. It can however also be an analog narrowband signal or a digital signal.

Figure 2:
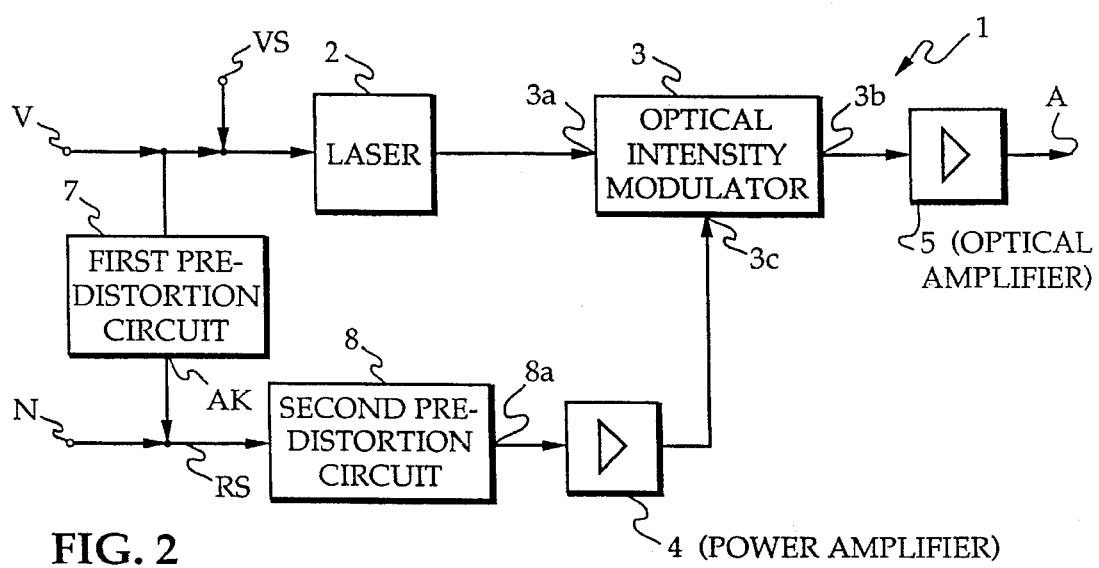

FIG. 2 shows an advantageous second embodiment example of the invention. The same reference numbers are used throughout for equivalent or functionally equivalent elements in the description and in FIG. 2.

The second embodiment example fulfills the same purpose of the first embodiment example using the same components of the first embodiment example. In addition, the energy-dispersing signal (V) is applied to a first predistortion circuit (7), the output signal (AK) of which is combined with the intelligence signal (N) and the resulting signal (RS) applied to a second predistortion circuit (8). This second predistortion circuit (8) is located in the path for indirect modulation of the laser (2) such that its output (8a) is connected to the electrical input (3c) of the intensity modulator (3) via the power driver amplifier (4).

The optical output (3b) of the intensity modulator (3) is followed by a first optical amplifier (5), the output signal of which is the output (A) of the optical transmitter (1).

The direct modulation of the laser (2) with the energy-dispersing signal (V), leads, in addition to the desired frequency modulation, to an undesired amplitude-modulation, such that the information contained in the output signal. (A) is distorted in comparison to that of the intelligence signal (N). The first predistortion circuit (7) is used to compensate for this additional amplitude-modulation. It generates a suitable signal which compensates for the undesired direct modulation via the indirect modulation of the carrier. In order to improve the possibility of equalization, it may be necessary to add an additional predistortion circuit, not indicated in FIG. 2, in the path for direct modulation of the laser (2).

The characteristic curve of a Mach-Zehnder interferometer used as the intensity modulator (3) has an undesired nonlinearity, which leads to a distorted indirect modulation and results above all from 2nd and 3rd order distortions. If an inflection point of the characteristic curve is advantageously selected as the operating point of the intensity modulator (3), the second order distortion is almost nil. The second predistortion circuit (8) is inserted into the arrangement to compensate for the 3rd order distortion. In addition to the manner represented in FIG. 2, it is also possible to arrange this second predistortion circuit (8) in the path for direct modulation of the laser (2). Of course, this would necessitate a different construction of the second predistortion circuit (8).

In addition to compensating for the 3rd order distortion of the intensity modulator (3), the second predistortion circuit (8) can also be laid out to compensate for the nonlinearities of additional optical components of the communications system. These additional components can even be located both within the optical transmitter (1), such as the laser (2) for example or the first optical amplifier (5), as well as located outside the optical transmitter (1) such as the optical fibers of the transmission route.

In addition, the modulating voltage required by the Mach-Zehnder interferometer for modulating the optical laser signal is quite high (ca, 6 to 12 $V_{ss}$) such that the intelligence signal (N) is first amplified by a power driver amplifier (4) to the required voltage level before being conducted to the intensity modulator (3).

In order to equalize the disadvantages of the semiconductor laser output power, which is less in comparison with a solid state laser and to equalize the disadvantages of the modulator insertion attenuation at the operating point of the intensity modulator (3), the optical output (3b) of the intensity modulator (3) is followed by the first optical amplifier (5). This generates an output signal (A) of the optical transmitter (1) with a high optical output power and can be, for instance, an erbium-doped fiber optic amplifier (EDFA) or some other type of doped fiber optic amplifier.

Additional driver amplifier elements and elements for transit time compensation were omitted for clarity.

Figure 3:
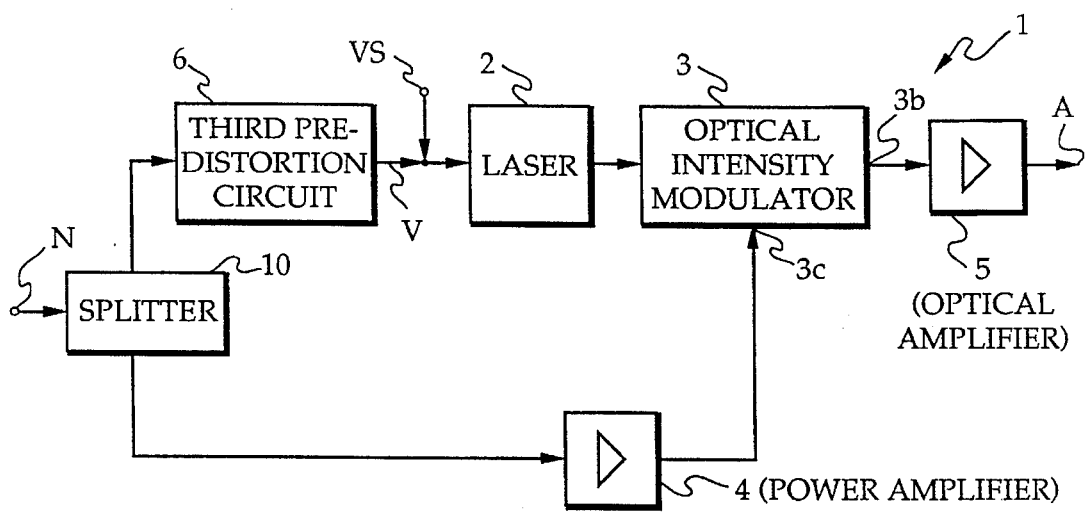

FIG. 3 shows an additional particularly advantageous third embodiment example of the invention. Again, the same reference numbers are used to denote equivalent or similar elements.

Using the same components as the preceding embodiment examples, the third embodiment example fulfills the same purposes. The intelligence signal (N) is conducted to a splitter (10), which then conducts it via the power driver amplifier (4) to the electric input (3c) of the intensity modulator (3) and, with its amplitude reduced, additionally to a third predistortion circuit (6), which in its effect corresponds to the second predistortion circuit (8) from embodiment example (2). The output signal of the predistortion circuit (6) is here the energy-dispersing signal (V), which is derived from the intelligence signal (N). The optical output (3b) of the intensity modulator (3) is followed, as in the second embodiment example, by the first optical amplifier (5). As mentioned above, this has the purpose of amplifying the laser output power to a higher level. Additional propagation time circuits and amplification circuits are not included in FIG. 3.

The third predistortion circuit (6) generates a signal to compensate for the nonlinearity of the power curve of the intensity modulator (3), such that the amplitude-modulation generated by the direct modulation is effectively used, unlike in the second embodiment example. An additional advantage of arranging the predistortion circuit (6) in the path for direct modulation of the laser (2) is that it relieves the power driver amplifier (4), which is heavily stressed in this application. The power driver amplifier must fulfill heavy demands on 2nd and 3rd order linearity and simultaneously supply the relatively high modulation voltage of the intensity modulator (3). Since it does not have to produce the correction power required to compensate for the nonlinearity of the power curve of the intensity modulator (3) it can consequently be of a lower power design or feature a higher signal linearity due to a lower maximum output. The direct modulation with the energy-dispersing signal (V) accordingly pursues two goals simultaneously in this case, which are simply and effectively realized with the arrangement of this embodiment example as claimed in the invention.

In order to also achieve a better possibility of equalization here as well, it can be meaningful to insert predistortion circuits, not illustrated in FIG. 3, both in the path for direct modulation as well as in the path for indirect modulation of the laser (2).

Figure 4:
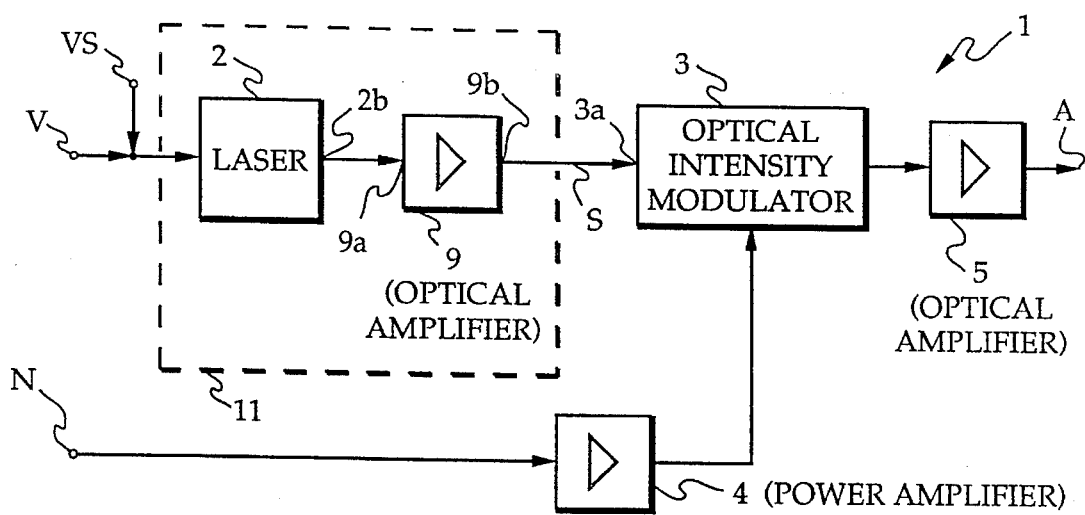

FIG. 4 show an additional advantageous fourth embodiment example of the invention. Again, the same reference designations are used for equivalent or similar elements.

The fourth embodiment example fulfills the same purposes with the same components as the preceding embodiment examples. The energy-dispersing signal (V) combined with the biasing current (VS) for direct modulation, is here fed to a transmitter module (11) consisting of a laser (2) and a second optical amplifier (9). A transmitter module (11) of this type can represent an available module tuned to these two construction elements, which can also be employed in optical transmitters other than those described in the preceding embodiment examples. The second optical amplifier (9) here is a fiber optic amplifier, containing among other elements, a light-amplifying fiber element doped with $Er^{3+}$ ions and a pump light source for stimulating the $Er^{3+}$ ions. However it can also be an optical semiconductor amplifier or another type of optical amplifier which can be operated within saturation. The second optical amplifier (9) follows the optical output of the laser (2) and is positioned in the embodiment example in the optical route between laser (2) and intensity modulator (3), such that its input (9a) is connected to the optical output (2b) of the laser (2) and its output (9b) is connected to the optical input (3a) of the intensity modulator (3).

Use of the transmitter module (11) in the optical transmitter (11), as claimed in the invention and as shown in this embodiment example, enables suppression in a simple fashion of the undesired amplitude-modulation generated by direct modulation of the laser (2). The second optical amplifier (9) is operated within saturation for this reason, i.e., on its static output-input power curve according to FIG. 5, where an operating point (AP) is selected in the saturation region such that faint variations of input power do not cause any variations of output power of the second optical amplifier (9). This exhausts the pumping power of its pump light source. The operating point (AP) is set for this reason by tuning the pumped light source and via the biasing current (VS) with the selection of the power of the input signal of the optical amplifier (9) corresponding to this demand. A static behavior of the second optical amplifier (9) is then present if the frequency of the energy-dispersing signal (V), and thereby the frequency of the input power variation of the second optical amplifier (9), is selected to be substantially lower than the reciprocal value of the average lifespan of the energy states of the light amplifying substance of the second optical amplifier (9) stimulated by the pump light of the pump light source. Hence in the case of an erbium-doped fiber optic amplifier (EDFA), the frequency is below 1 MHz. In order to maintain a good saturation behavior of the second optical amplifier (9), the frequency of the energy-dispersing signal (V) should be as low as possible. On the other hand, it is not possible to make it arbitrarily small, since the frequency and the amplitude of the energy-dispersing signal (V) determine the frequency chirp behavior. Accordingly, the lower the frequency selected, the higher the amplitude must be in order to continue to be able to ensure the necessary frequency chirp behavior for reduction of Brillouin scattering. Nevertheless, the higher the amplitude, the worse the saturation behavior of the second optical amplifier (9). Frequencies in the range of several kHz have proven to be particularly advantageous under consideration of the aforementioned boundary conditions. The frequency modulation developed due to frequency chirp remains uninfluenced by this manner of employing the second amplifier (9). The output signal S of the transmitter module (11) represents, for this reason in the ideal case, an exclusively frequency modulated signal, which is best for reduction of Brillouin scattering occurring in the fiber of the transmission route.

What is claimed is:

1. An optical transmitter (1) for a communications system comprising:

A) a laser (2) generating a carrier that is directly modulated by an energy dispersing signal (V) for providing a modulated carrier (2b, 3a);

B) an optical intensity modulator (3) having a characteristic curve with a non-linearity caused primarily by second- and third-order distortions, said optical intensity modulator being operated at an inflection point of said characteristic curve to compensate for said second-order distortions, said optical intensity modulator receiving the modulated carrier (2b, 3a) and an intelligence signal (N), said optical intensity modulator indirectly modulating said modulated carrier with the intelligence signal (N); and C) means for generating the energy-dispersing signal (V) (6; 7, 8) so that the energy-dispersing signal (V) is a signal for compensating the non-linearity of at least the third-order distortions of the optical intensity modulator (3).

2. An optical transmitter as claimed in claim 1, characterized in that the laser (2) is a semiconductor laser, and wherein the optical transmitter further comprises an optical amplifier (5) connected to the output of the optical intensity modulator (3).

3. An optical transmitter as claimed in claim 1, characterized in that the optical intensity modulator (3) is a Mach-Zehnder interferometer.

4. An optical transmitter as claimed in claim 1, characterized in that the intelligence signal (N) is an analog broadband signal.

5. An optical transmitter (1) for a communications system comprising:

A) a laser (2) generating a carrier that is directly modulated by an energy dispersing signal (V);

B) an optical intensity modulator (3) for receipt of the modulated carrier (2b, 3a) and for receipt of an intelligence signal (N), said optical intensity modulator indirectly modulating said modulated carrier with the intelligence signal (N);

C) a splitter (10) having an input connected to the intelligence signal (N), and also having first and second splitter outputs, the first splitter output for connection to the optical intensity modulator (3); and D) a pre-distortion circuit (6) for receipt of the second splitter output, for converting the intelligence signal (N) into the energy-dispersing signal (V), which is a signal derived from the intelligence signal (N) and further so that the energy-dispersing signal (V) serves to compensate for the non-linearity of the optical intensity modulator (3).

6. An optical transmitter as claimed in claim 5, characterized in that the laser (2) is a semiconductor laser, and wherein the optical transmitter further comprises an optical amplifier (5) connected to the output of the optical intensity modulator (3).

7. An optical transmitter as claimed in claim 5, characterized in that the optical intensity modulator (3) is a Mach-Zehnder interferometer.

8. An optical transmitter as claimed in claim 5, characterized in that the intelligence signal (N) is an analog broadband signal.

9. An optical transmitter (1) for a communications system comprising:
   A) a laser (2) generating a carrier that is directly modulated by an energy dispersing signal (V);
   B) an optical intensity modulator (3) for receipt of the modulated carrier (2b, 3a) and for receipt of an intelligence signal (N), said optical intensity modulator indirectly modulating said modulated carrier with the intelligence signal;
   C) a first pre-distortion circuit (7) to compensate for amplitude modulation of the laser output caused by direct modulation of the laser by the energy-dispersing signal (V), wherein the output of the first predistortion circuit (7) is combined with the intelligence signal (N); and
   D) a second pre-distortion circuit (8) connected to the output of the first pre-distortion circuit (7) and to the intelligence signal (N) for compensating for additional non-linearities of the optical transmitter.

10. An optical transmitter as claimed in claim 9, characterized in that the laser (2) is a semiconductor laser, and wherein the optical transmitter further comprises an optical amplifier (5) connected to the output of the optical intensity modulator (3).

11. An optical transmitter as claimed in claim 9, characterized in that the optical intensity modulator (3) is a Mach-Zehnder interferometer.

12. An optical transmitter as claimed in claim 9, characterized in that the intelligence signal (N) is an analog broadband signal.

13. A transmitter module (11) for an optical transmitter (1) of a communications system, comprising;
   A) a laser (2) having an input and an output (2b), the input receiving an energy-dispersing signal (V) so that the generated output of the laser is directly modulated by the energy-dispersing signal; and
   B) an optical amplifier (9) having an input (9a) for receipt of the laser output, and an output (9b), the output of the amplifier being the output (S) of the transmitter module (11), the amplifier having means such that the amplitude variation of output (S) is suppressed, so that when output (S) is modulated by an intelligence signal (N) at an intensity modulator (3), the pre-distortion of output (S) reduces distortion of the amplified output (A) of intensity modulator (3).

14. A transmitter module as claimed in claim 13, wherein the optical amplifier (9) has a light amplifying substance having an average life span of energy states generated by stimulation by a pumping light generated from an integrated pumping light source, and wherein the frequency of the energy-dispersing signal (V) is lower than the reciprocal value of the average life span of the energy states of the light amplifying substance of the optical amplifier (9) stimulated by a pumping light generated from an integrated pumping light source in the optical amplifier (9).

Figure 5:
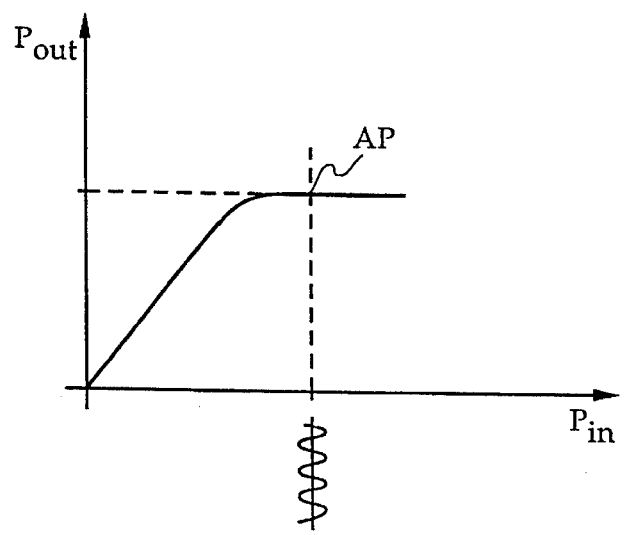

15. A transmitter module as claimed in claim 14, characterized in that the optical amplifier (9) is operated at an operating point (AP) located in the saturation region of its static output-input power curve (FIG. 5).

16. A transmitter module as claimed in claim 13, characterized in that the optical amplifier (9) is a fiber optic amplifier.

* * * * *